Aug. 21, 1956        C. H. O. BERG        2,759,878
PROCESS FOR TREATING HYDROCARBONS IN A MOVING BED WITH
SOLID PARTICLES AT DIFFERENT TEMPERATURE LEVELS
Filed April 26, 1951        2 Sheets-Sheet 1

INVENTOR.
CLYDE H. O. BERG,
BY
AGENT.

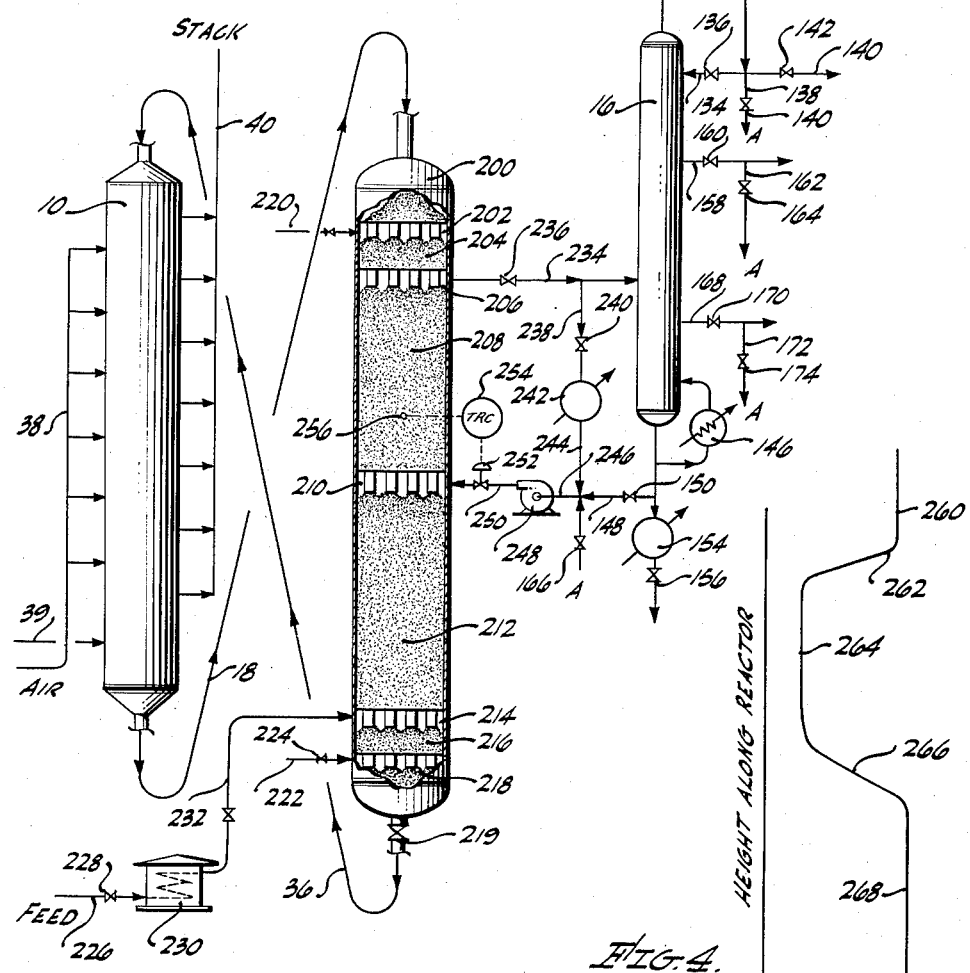

United States Patent Office 2,759,878
Patented Aug. 21, 1956

2,759,878

PROCESS FOR TREATING HYDROCARBONS IN A MOVING BED WITH SOLID PARTICLES AT DIFFERENT TEMPERATURE LEVELS

Clyde H. O. Berg, Long Beach, Calif., assignor to Union Oil Company of California, Los Angeles, Calif., a corporation of California Application April 26, 1951, Serial No. 223,104

22 Claims. (Cl. 196—52)

This invention relates to the contacting of fluids with a moving stream of solid catalyst or other solid materials and in particular relates to the contacting of fluids by granular solids such as catalysts under such conditions that a dual temperature is established in the contacting zone or zones, whereby the fluids are first contacted at one temperature and subsequently contacted at a different temperature, either higher or lower, by the same solids stream.

The contacting of catalyst or other granular solids with a vaporous or gaseous stream at two temperatures is of considerable advantage in a number of contacting processes. For example, the cracking of hydrocarbons may be followed by a higher temperature cracked product reforming step with the same catalyst or simultaneous desulfurization and denitrogenation may be effected advantageously in hydrocarbons by two temperature operations in which two contacting zones of different temperature are established. In the high temperature contacting zone the hydrocarbon compounds are desulfurized or cracked. In the low temperature contacting zone the residual or heavier hydrocarbons are retained or adsorbed on the catalyst and recycled to the high temperature zone with the catalyst and are thus ultimately reacted to form more volatile nitrogen and sulfur-free hydrocarbons. Another modification of the present invention is specifically applied to the treating of gasoline or other naphtha fractions whereby a simultaneous denitrogenation and desulfurization and general upgrading takes place in the low temperature and the high temperature portions of the reaction zone.

The foregoing are modifications in specific form to which the process of the present invention may be applied with advantage. It is, however, not to be understood that these are the only modifications since the art is complete with disclosure of processes wherein granular solids are first contacted with a vaporous stream at one temperature and subsequently contacted at a different temperature.

It is a primary object of the present invention therefore to provide an improved process for contacting solids and a fluid under conditions involving such a dual temperature level.

A further object of the present invention is to provide for the simultaneous contacting of a granular catalyst with a fluid to be converted in which a simultaneous cooling of one portion of the catalyst bed and a beneficial re-treating of part of the product is obtained.

An additional object of the present invention is to provide a process for the treatment of hydrocarbon fractions with a granular catalyst in a contacting zone containing reaction zones maintained at substantially different temperatures of at least 50° F. apart, the lower temperature zone being cooled by a recycling stream of liquid product for the simultaneous quenching of the catalyst and re-treating of the liquid thus recycled.

It is also an object of the present invention to provide an apparatus to accomplish the aforementioned objects.

Other objects and advantages of the present invention will become apparent to those skilled in the art as the description thereof proceeds.

Briefly the present invention comprises an improved countercurrent or partially countercurrent contacting process for effecting the contact of granular solids which may or may not have catalytic activity, with a fluid to be reacted or treated, in which process the reaction or contacting zone is operated according to methods of the present invention to establish a dual temperature level, that is, two separate zones within the contacting zone are established, each of which has a temperature substantially different from the temperature of the adjacent zone. Thus a contacting zone containing two reaction zones is established, the reaction zones comprising a relatively low temperature, and a relatively high temperature reaction zone. The fluid to be treated is introduced substantially at the relatively high temperature desired in the high temperature reaction zone. At a point between the high and low temperature reaction zones, a cool fluid, which is preferably a portion of the product produced from the contacting zone and also preferably in the liquid phase, is injected and combined with fluid flowing from the high temperature zone into the low temperature zone. A quench of the catalyst is hereby effected and a heating and/or vaporizing of the recycle quench stream forms a cool gaseous mixture of recycle and vapor from the high temperature zone which directly contacts and cools the solids flowing through the low temperature zone. Preferably this mixture of recycle fluid and vaporized treated feed stock passes from the high temperature zone through the low temperature zone countercurrent to the granular solids flow therein.

In one modification the high temperature zone may be isolated in a separate contacting column and the low temperature zone maintained in a second separate column. Preferably in such a case a high temperature region is established adjacent the bottom of the low temperature column. The reasons and advantages for this high temperature bottom zone will be described below. In another modification both the high temperature and low temperature reaction zones may be established in a single contacting column as hereinafter described.

It has been found that the temperature relationships existing in a zone in which granular solids and a fluid are contacted are strongly dependent upon the rates of flow of granular solids and of the fluid to be contacted, the temperatures at which they are introduced into the contacting zone, the specific heats of the solids and of the fluid, the heat transfer coefficient existing between the fluid and the granular solids, and to lesser extents upon other factors. When contacting granular solids and a fluid countercurrently under conditions where the granular solids and the fluid are introduced at different temperatures, the resulting temperature of the contacting zone is substantially the same as the temperature of the solids introduced when the product of the fluid mass flow rate times the fluid specific heat is less than the solids mass flow rate times the solids specific heat. Thermally the solids stream dominates the temperature conditions within the contacting zone. The reverse situation is true under the reverse conditions, that is, the temperature of the contacting zone is substantially that of the inlet temperature of the fluid throughout the contacting zone when the fluid mass flow rate times the fluid specific heat is greater than the solids mass flow rate timts the solids specific heat. In the process of the present invention it is preferred that the granular solids and the fluid to be contacted are brought in to countercurrent contact in the low temperature zone under such conditions that the fluid mass flow rate times the fluid specific heat exceeds that of the granular solids, that is, the mass specific heat of the fluid stream exceeds the mass specific heat of the solids stream and thus thermally dominates. Countercurrent or concurrent contact may be employed as desired in the high temperature zone.

The above invention as briefly described is applicable with particularly advantageous results in the contacting of hydrocarbons with hydrocarbon conversion catalysts. Such catalytic reactions include cracking, coking, desulfurization, aromatization, denitrogenation, isomerization, hydrogenation and dehydrogenation, and hydrocarbon reforming reactions in general which are advantageously effected by carrying these reactions out in two stages having different temperature levels. Gasolines, gas oils, and various hydrocarbon naphthas, including all the vaporizable fractions, may be so treated, hydrocarbon fractions from shale oil, oil recovered from tar sand, coal, etc. being also included. The granular solids employed may involve noncatalytic heat transfer solids such as the inactive forms of alumina and the like, or they may involve the many well-known active catalysts for favorably effecting the reaction rates of the foregoing listed reactions and will not be repeated here.

Specifically, the present invention is applicable to the simultaneous denitrogenation of hydrocarbon cracking stocks and the cracking of petroleum, shale, coal oil, and other hydrocarbon fractions. It is likewise specifically applicable to the so-called treating of such hydrocarbon fractions as gasoline for the improvement of knock rating, odor, storage stability, color, and other physical characteristics of the material by nitrogen and sulfur removal.

It has been found in the present invention that the catalytic denitrogenation of such hydrocarbon materials may be effected on a silica-alumina cracking catalyst, either synthetic bead or acid-treated natural clay, at temperatures relatively low compared to the conventional hydrocarbon conversion temperatures. Thus it has been found that gasoline and gas oil denitrogenation is best effected by relatively long contact of between 0.1 and 30 minutes at temperatures in the range of from 300° F. to 700° F., whereas the cracking reactions require temperatures in the range of from 700° F. to as high as 1200° F. for the lighter naphthas. Similarly, desulfurization of hydrocarbon stocks may be effected on a preliminarily hydrated silica-alumina cracking catalyst at temperatures in the range of from 700° F. to 1200° F. without the loss of octane value and at surprisingly high yields. The preliminary hydration of the catalyst has been found to aid materially the effectiveness of the catalyst as illustrated subsequently. Preferably temperatures for denitrogenation lie in the range of from 400° F. to 675° F. Preferably temperatures for desulfurization lie in the range of from 725° F. to 950° F. and for hydrocarbon cracking the preferred temperatures are from 800° F. to 1050° F. For gasoline reforming reactions temperatures between 850° F. and 1150° F. are preferred.

The different temperature zones established in the contacting zone of the present invention are preferably disposed such that the low temperature zone is downstream, relative to the fluid flow, from the high temperature zone, that is, the fluid first contacts granular solids at the elevated temperature and is subsequently treated at the lower temperature. The solids flow first through the low and subsequently through the high temperature zone. It has been unexpectedly found, particularly in the hydrocarbon conversion reactions, that an increased catalyst effectiveness results from this procedure and which effectiveness is further enhanced when a portion of the liquid product is employed to quench the granular solids. This increase in effectiveness is considerably greater than that found when the stream of catalyst is divided and one stream is indirectly cooled to the desired lower temperature. It is believed that this is due to the utilization of a liquid recycle stream as a quench injected between the low temperature and high temperature zones in such a manner that an internal recycle of difficultly convertible hydrocarbon constituents is obtained within the contacting zone. Thus as the feed stock vapor flows countercurrently through the high temperature zone and subsequently the low temperature zone, the difficulty convertible constituents including the higher molecular weight uncracked hydrocarbons and the hydrocarbon compounds of oxygen, sulfur, and especially nitrogen apparently are retained by selective adsorption on the catalyst in the low temperature zone and subsequently flow therewith back into the high temperature zone. In the high temperature zone they are either reacted to form more volatile products or are stripped from the catalyst at the higher temperature with the aid of the feed stock passing therethrough and flow again into the low temperature zone where they are reacted or readsorbed on the solids. Thus these constituents, which comprise the hydrocarbon compounds named above, continuously recirculate between the low and high temperature reaction zones within the contacting zone until they are decomposed or reacted to form sufficiently high volatility products as to be removable through the low temperature zone without substantial retention on the catalyst. The low temperature zone is preferably maintained at a temperature equal to or a little above (between 5° and 100° F.) the desired end point (Engler distillation) of the product hydrocarbons being produced. Thus in the specific modifications described above the high temperature zone may be maintained at such a temperature that any of the desired cracking, reforming, desulfurization, and other reactions listed above may be carried out and the low temperature zone maintained within the preferred temperature limits given to effect a denitrogenation or other lower temperature reaction. The product contains the converted hydrocarbons of the desired boiling range and also fragments of the decomposed hydrocarbon compounds of sulfur, oxygen, and nitrogen appearing as hydrogen sulfide, water, and ammonia, each of which is readily separable by stripping or other means from the hydrocarbon product. For example, subsequent distillation may produce a relatively unreacted recycle stream as bottoms, a heavy gasoline fraction boiling between about 350° F. and 425° F., a light gasoline fraction boiling between about 100° F. and 350° F., a stream of normally gaseous hydrocarbons consisting of methane, ethane, propane, and some butane together with their unsaturated homologs, as well as ammonia, water, and hydrogen sulfide mentioned above.

In the present invention, which involves quenching the catalyst stream with a recycle product fluid, preferably a liquid, either the light gasoline, the heavy gasoline, or the bottoms stream of substantially unreacted hydrocarbons may be employed as the quenching fluid. In a combination gasoline desulfurization and denitrogenation operation preferably the heavy gasoline stream is recycled since it has been found somewhat more difficult to remove nitrogen from this stream than from the light gasoline stream. This recycle stream may be combined with all or part of the susbtantially unreacted bottoms product for re-treatment, and particularly is this true in dual temperature conversions involving cracking. A particularly desirable modification involves the recycle of a portion of a total condensate prepared by cooling all or a portion of the product from the low temperature zone and recycling sufficient quantities of the condensate to obtain the desired degree of quenching and to establish the desired temperature in the low temperature reaction zone.

In either of the modifications of the present invention involving one or two column operation, an important feature in both cases is the maintenance of a relatively high temperature at the catalyst or granular solids draw-off point from the columns. This is required to minimize loss of fluid product or fluid feed stock which occurs by retention on a relatively low temperature solids stream. Therefore, in the one column modification, the low temperature zone is located at the top with the high temperature zone at the bottom of the column. In the two column modification the preferable form is with the feed passed through the high temperature column first and then through the low temperature column which is provided with an auxiliary high temperature zone at the bottom adjacent to vapor inlet. Thus the low temperature zone is preferably upstream with respect to the catalyst or granular solids flow with the high temperature zone downstream relative to the solids flow.

Also, it is preferred to employ a sealing and stripping zone adjacent the solids inlet and outlet of all columns and in which the granular solids are countercurrently contacted with a stripping gas such as steam to strip materials retained on the solids and maintain the liquid yield of the process at its normally high value. Thus, the retention of difficulty convertible constituents not stripped by the high temperature and including the more refractory portions of a gas oil cracking stock and the hydrocarbon compounds of oxygen, sulfur, and nitrogen is prevented and these compounds are hereby prevented from flowing from the reaction zone with the solid material. Thus the subsequent loss by combustion or other reaction in the solids regeneration zone is avoided. These constituents are forced to remain within the reaction zone for ultimate conversion. In this manner the constituents are not separated from the feed stock in unreacted form prior to a certain conversion reaction in the reaction zone but are continuously treated and re-treated by an internal recycling between the low and either the high temperature zone or auxiliary high temperature zone in the two column modification for ultimate conversion under such conditions that the hydrocarbon residue from the oxygen, nitrogen, and sulfur compounds is produced with the hydrocarbon product. Thus liquid yields on the order of 95 to 99% are readily obtainable and in some cases of hydrocarbon conversions in the presence of hydrogen, such as reforming, hydrogenation, and desulfurization, volumetric liquid yields of 100% and higher are obtained.

This ultimate conversion to desired products of the undesired constituents in the feed stock and prevention of fluid losses are of considerable importance from a liquid recovery standpoint because of the fact that a feed stock containing 0.5% of nitrogen contains 2–3% by volume of hydrocarbon compounds of nitrogen. Similarly, a feed stock containing 3–4% sulfur contains this sulfur as hydrocarbon sulfur compounds amounting to 10% or more by volume of the feed stock. Thus mere removal in their original form of these contaminating compounds immediately reduces the liquid yield obtainable to 90% or less without a consideration of further loss of liquid yield through the formation of gas and coke. The present invention, therefore, has inherent features of great value relative to the existing contacting processes for hydrocarbon conversion.

Although the foregoing emphasis has been placed on the treatment of hydrocarbons to which the present invention is applicable with great advantage, it should be understood that the primary object of the invention is to provide a solids-fluid contacting process wherein dual temperature levels or two reaction zones operating at different temperatures are established within a given bed of solids and that such a process is applicable to many other contacting processes which do not necessarily involve a hydrocarobn in the feed stock. A typical example is the Fischer-Tropsch catalytic synthesis of oxygenated organic compounds and of synthetic hydrocarbons through the catalytic treatment of a mixture of carbon monoxide and hydrogen, and there are many others.

The present invention may be more clearly understood by reference to the accompanying drawings, in which:

Figure 3 shows a schematic flow diagram in partial cross-section of the process of the present invention in which the contacting zone comprises a single column having a low temperature and a high temperature zone, and Figure 4 is a graphical representation of the temperature profile established within the contacting zone.

Figure 1:
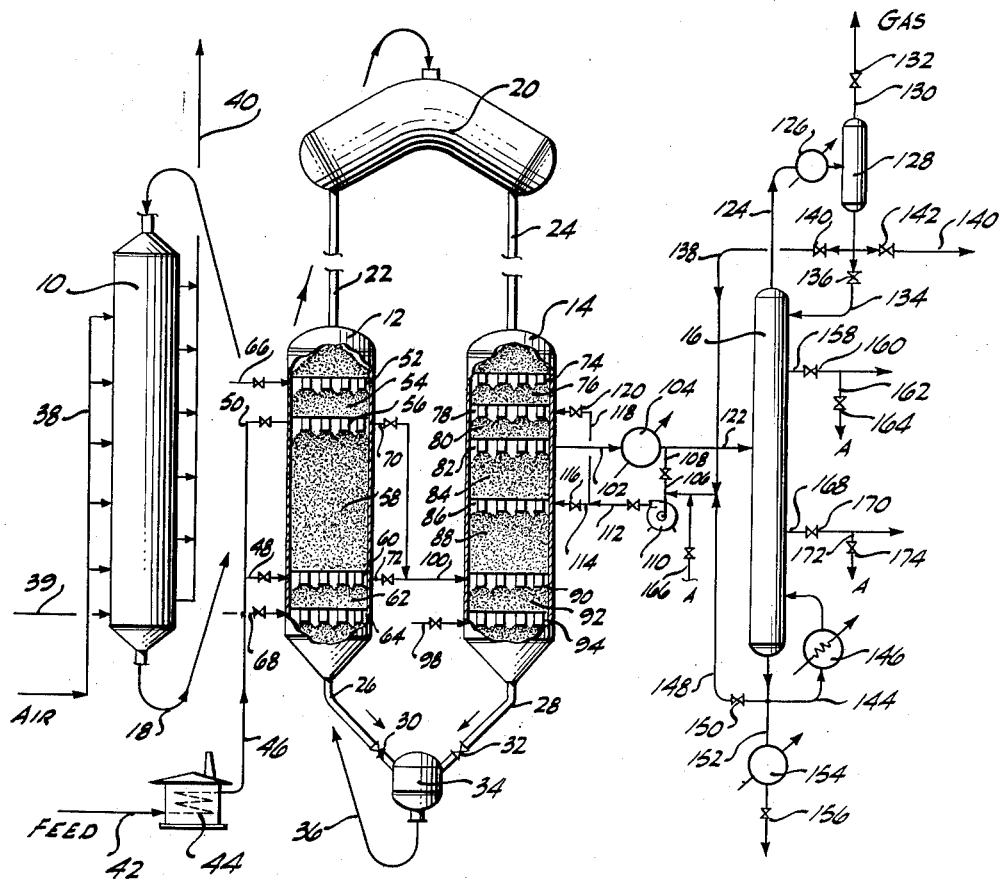
Figure 1 shows a schematic flow diagram of the process of the present invention in which two contacting vessels are included in the contacting zone.

Referring now more particularly to Figure 1, the apparatus includes regenerator 10, high temperature contacting column 12, low temperature contacting column 14, and product fractionator 16. Regenerated granular solids are conveyed by means of elevator 18 to regenerated catalyst hopper 20 from which, in this two vessel modification, separate streams of catalyst are conveyed via sealing legs 22 and 24 respectively into contacting columns 12 and 14. The spent catalyst subsequently flows from the two columns respectively via lines 26 and 28 controlled respectively by catalyst flow control valves 30 and 32 into spent catalsyt hopper 34 and subsequently via elevator 36 back to regenerator 10.

The spent catalyst is regenerated to remove the carbonaceous and hydrocarbonaceous deposits thereon by contact with a stream of an oxygen-containing gas such as air with or without diluent material such as flue gas. The air is introduced via line 38 preferably at a plurality of points and line 39 is provided for steam injection to effect catalyst hydration. The regeneration gases are removed therefrom via line 40 and disposed of to the atmosphere.

The present invention will be described by way of an example in which 25,000 bbls./day (42 U. S. gallons per barrel) of a gas oil having 26.5° API gravity, 3.9% sulfur, 0.3% nitrogen, and having a boiling range of between 160° F. and 950° F. is treated to denitrogenate and crack the gas oil. The gas oil feed stock is passed via line 42 into feed stock vaporizer 44. The gas oil vapor is passed subsequently via line 46 and via line 48 when countercurrent contact is desired or via line 50 when concurrent contact is desired. The catalyst comprises a synthetic bead silica-alumina cracking catalyst containing 0.006% by weight of chromium as a regeneration improving agent. The catalyst is introduced into high temperature reactor 12 at a rate of 230 tons per hour, giving a catalyst-to-oil ratio of about 1.5. The catalyst temperature on introduction is 900° F. The gas oil vapor is introduced into reactor 12 at a temperature of 800° F.

The catalyst thus introduced passes downwardly through high temperature reaction column 12 successively through seal gas engaging zone 52, sealing zone 54, concurrent feed gas engaging or countercurrent product gas disengaging zone 56, high temperature reaction zone 58, countercurrent feed engaging zone or concurrent product disengaging zone 60, stripping and sealing zone 62, and stripping and sealing gas engaging zone 64. A sealing gas such as inert flue gas or steam in hydrocarbon conversion operations is introduced via line 66 into engaging zone 52 thereby sealing the atmosphere in catalyst hopper 20 from the atmosphere in reaction zone 58. Catalyst hydration may be effected in this way at the top of the contacting vessels 12 and 14 by using steam as a seal gas at this point. At the bottom of high temperature column 12 a stripping gas such as steam is introduced via line 68 for passage countercurrently through sealing and stripping zone 62 and concurrently with the catalyst from the bottom of the unit. Residual volatile materials retained on the catalyst are stripped therefrom in zone 62 and passed either into zone 58 or are removed from disengaging zone 60 by means not shown.

The high temperature product passes either via line 70 or via line 72, depending on whether countercurrent or concurrent contact is employed, at a temperature of about 850°–900° F. and into low temperature column 14 for the low temperature part of the reaction process. In this column the catalyst passes successively through seal gas engaging zone 74, sealing zone 76, secondary quench fluid engaging zone 78, secondary quenching zone 80, product disengaging zone 82, low temperature reaction zone 84, primary quench fluid engaging zone 86, secondary or auxiliary high temperature zone 88, high temperature fluid engaging zone 90, sealing and stripping zone 92, and stripping and sealing gas engaging zone 94. As before, a seal gas is introduced into zone 74 via line 96 at the top of low temperature column 14. Similarly, a sealing and stripping gas is introduced via line 98 into sealing and stripping zone 92. The purposes of both of these streams are the same as those of analogous streams injected into high temperature column 12.

The high temperature effluent from high temperature reaction zone 58 passes via line 100 into secondary high temperature zone 88 maintained at 850°–900° F. The high temperature effluent passes through secondary high temperature zone 88 countercurrently to the down flowing catalyst and wherein further high temperature reaction may be effected. It is combined with vapor formed by the evaporation of the quench fluid introduced thereinto at a point adjacent quench fluid engaging zone 86. A sufficient quantity of total condensate is injected as the quench liquid to produce a low temperature zone temperature of about 550° F. The combined fluids thus resulting are substantially at the temperature desired in low temperature reaction zone 84, viz. 550° F., and they flow therethrough for removal from disengaging zone 82 by means of line 102. Particularly in this column the mass times the specific heat of the combined quench vapor and the high temperature effluent is considerably greater than the mass times the specific heat of the granular catalyst. Thus, although the granular catalyst is introduced at a relatively high temperature at which it is discharged from the regenerator, the cool vapors resulting upon vaporization of the quench fluid thermally dominate the countercurrent solids to fluid contact in low temperature reaction zone 84, reducing the catalyst temperature therein to the desired low temperature. The temperature resulting is controlled by varying the quantity of quench fluid employed and it also may be varied by controlling the catalyst flow rate through the low temperature reaction column 14.

In low temperature reaction column 14 the undesirable constituents referred to above are retained by adsorption on the catalyst during passage through low temperature reaction zone 84 and pass with the catalyst back into secondary high temperature zone 88. They are removed thermally from the catalyst at the elevated temperature herein or by subsequent stripping in stripping zone 92. They subsequently pass again upwardly with the high temperature effluent and with its admixture with the vaporized quench liquid through zone 84 for readsorption on the catalyst. Thus an internal recycle of the heavier unreacted constituents is established which continues during operation and retains the unreacted materials for a sufficient time, recycling between low temperature zone 84 and secondary high temperature zone 88, until reaction occurs which reduces these constituents to more volatile decomposition products such as a hydrocarbon fragment and an inorganic vapor such as hydrogen sulfide, ammonia, or water vapor. The product is removed from low temperature column 14 via line 102 at a temperature of about 650° F. and is passed through cooler 104. If desired, a portion of the condensate thus obtained passes via line 106 controlled by valve 108 through recycle pump 110. This portion of the quench fluid then passes via line 112 either through line 114 into primary quench fluid engaging zone 86 at a rate controlled by valve 116 or via line 118 at a rate controlled by valve 120 into secondary quench fluid engaging zone 78. The introduction of quench fluid via the primary engaging zone is preferred since a more efficient re-treating thereof is obtained. In the foregoing modification a portion of the total product condensate is employed as quench fluid. As subsequently described, various fractions of the product may be isolated and employed as the quench fluid.

At least part of the product, which may be as a total condensate or either partially or totally vaporized, is passed via line 122 into product fractionator 16. In this column the product from the low temperature reaction zone is fractionated, the overhead vapors being removed via line 124, condensed in reflux condenser 126, and collected in reflux drum 128. Gas product consisting mostly of hydrogen, methane and saturated and unsaturated $C_2$ and $C_3$ hydrocarbons, is removed via line 130 controlled by valve 132. The overhead condensate is at least partly returned via line 134 controlled by valve 136 as reflux to the top of the column. A portion of this light product may be employed as the quench liquid and in such a modification is passed via line 138 at a rate controlled by valve 140 through quench pump 110 and ultimately to either of the quench fluid engaging zones 78 or 86. If desired, any remaining portion of this light liquid is removed via line 140 at a rate controlled by valve 142. This product stream contains propane, butane, pentane, and the like in quantities varying according to the pressure of the fractionation system and may also contain unsaturated hydrocarbons having 3, 4, and 5 carbon atoms per molecule.

The bottoms liquid from fractionator 16 is partly passed via line 144 through reboiler or reheater 146 and reintroduced into the bottom of the fractionation column. A portion of this liquid stream may be passed via line 148 controlled by valve 150 and via quench pump 110 into the quench fluid engaging zones. Any residual unreacted liquid is passed via line 152 through product after cooler 154 and sent to storage or further processing at a rate controlled by valve 156.

If desired, side cut fluids may be produced from fractionator 16 at appropriate points along the length thereof to produce intermediate fractions of intermediate boiling range. A light gasoline fraction may be removed via line 158 at a rate controlled by valve 160 and all or a part thereof may be passed via line 162 at a rate controlled by valve 164 and subsequently through line 166 into quench pump 110 for use as the quench liquid. Similarly, a heavy gasoline fraction may be removed from the column via line 168 controlled by valve 170. Similarly, all or a part of this stream may be passed via line 172 controlled by valve 174 through line 166 and by means of quench pump 110 into low temperature column 14.

In practice, it has been found that heavy gasoline stream contains somewhat more nitrogen compounds than the light gasoline stream and consequently if any fraction of the gasoline stream is to be recirculated, the heavy gasoline stream is employed to obtain full advantage of the retreating of the quench fluid by the cooled catalyst. Preferably, however, from an operational standpoint it is preferred to return as quench fluid a portion of the total product condensate and this may be effected by employing as cooler 104 a partial condenser, if desired.

It should be noted at this point that the employment of a recycle quench and re-treating stream does not increase the heat requirement or the cooling water requirement of the process over that employed with a once-through operation. The heat required to revaporize the quench fluid is obtained from the heat content of the moving catalyst stream cooling between the temperature limits defined by the relatively high temperature at which the catalyst is introduced into the low temperature reactor 14 and the desired temperature in the low temperature reaction zone.

Figure 2:
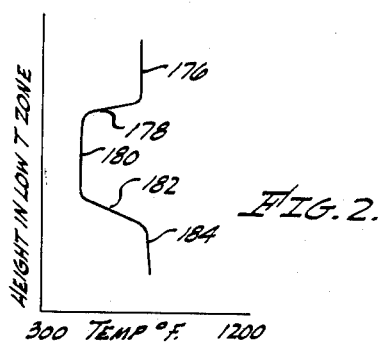
Figure 2 is a graphical representation of the temperature profile existing within the low temperature column.

Referring now more particularly to Figure 2, a graphical representation of the temperature profile in low temperature column 14 is shown. The catalyst passes in this figure at a relatively high temperature indicated by the upper portion of curve 176, denoting the temperature of the catalyst in zones 76 and 80 when a primary quench engaging zone is employed. Since the cool stream of combined quench fluid and high temperature reactor effluent thermally dominates the catalyst flow, a rapid temperature break 178 is maintained in the upper part of low temperature reaction zone 84 and the resulting low temperature denoted by portion 180 of the curve exists throughout the major part of low temperature zone 84 as well as a substantial part of secondary high temperature zone 88. In the lower portion of this latter zone 88 a temperature break 182 in the opposite direction is generated by the introduction of the high temperature effluent from high temperature reaction zone 58 if the fluid thermally dominates the catalyst flow. The position of this temperature break depends primarily upon the product of the mass flow rate and the specific heat of the catalyst and the mass flow rate and the specific heat of the high temperature effluent. The temperature break will exist at the bottom part of secondary high temperature zone 88 if the mass rate times the specific heat of the catalyst is greater (and the catalyst therefore thermally dominates) than the mass rate times the specific heat of the high temperature zone effluent. If the high temperature effluent thermally dominates the catalyst flow, temperature break 182 will rise to a position just below primary quench fluid engaging zone 86. The catalyst removed from the bottom of the column exists at a relatively high temperature indicated by portion 184 of the curve. Thus retained liquids on the catalyst are stripped at a high temperature point and the maintenance of this high temperature minimizes this retention of adsorbed materials.

Referring now more particularly to Figure 3, a modification is shown in which the process of the present invention is applied to establishing a dual temperature contacting zone in a single column. Elements in this modification which are analogous to those described in connection with Figure 1 will be indicated by the same numerals.

The following modification will be described as a typical example of the operation in simultaneously denitrogenating and desulfurizing a gasoline stream in an operation termed gasoline treating or upgrading. Gasoline is introduced at a rate of 15,000 bbls./day and a silica-alumina cracking catalyst is passed through the column by gravity at a rate of 91 tons per hour, giving a catalyst-to-oil weight ratio of 1.88. The boiling range of the gasoline is from 95° F. to 400° F., it contains 0.014% by weight of nitrogen in the light gasoline fraction and 0.030% in the heavy gasoline in 0.178% by weight of sulfur in the light gasoline and 0.132% in the heavy gasoline (the 300°–400° F. fraction). The catalyst is introduced into the top of the column at a temperature of 695° F., the feed stock is introduced as a vapor at a temperature of 852° F., and a recycle stream of 4500 bbls./day of total product condensate in the liquid phase at 99° F. is injected to cool the low temperature zone to an average temperature of 410° F. while maintaining the high temperature reaction zone at 790° F.

This modification is provided with an analogous catalyst reactivation column 10 and product fractionation column 16 as was shown in Figure 1. Granular catalyst is removed from regenerator and conveyed via elevator 18 and is introduced into the top of contacting column 200. Granular catalyst is removed from the bottom of column 200 and is conveyed via elevator 36 to the top of the regeneration column. As in Figure 1, air is introduced as a regeneration gas via line 38 and spent regeneration gases such as flue gas are removed via line 40. The regeneration system and the product fractionation system will not be described further but suffice it to say that it operates in an entirely analogous manner to that described in Figure 1.

Contacting column 200 is provided at successively lower levels therein with upper sealing gas engaging zone 202, sealing zone 204, product disengaging zone 206, low temperature reaction zone 208, quench liquid engaging zone 210, high temperature reaction zone 212, feed vapor engaging zone 214, stripping and sealing zone 216, and sealing and stripping gas engaging zone 218. Sealing gas is introduced into the upper seal gas engaging zone via line 220 while stripping gas is introduced via line 222 at a rate controlled by valve 224.

The feed stock gasoline passes via line 226 at a rate controlled by valve 228 into feed stock vaporizer 230. The feed vapor, at a temperature of 852° F., passes via transfer line 232 into engaging zone 214. It passes countercurrently through high temperature reaction zone 212 wherein the hydrocarbon compounds of sulfur are decomposed, forming a hydrocarbon fragment and hydrogen sulfide. The high temperature gasoline vapor leaving zone 212 is combined with the liquid gasoline quench introduced at zone 210 at a rate of 4500 bbls./day and is vaporized by direct contact with the catalyst. The combined vapors, at a temperature of about 410° F., pass countercurrently through low temperature reaction zone 208 wherein the hydrocarbon compounds of nitrogen are either decomposed to form a hydrocarbon fragment and ammonia or are retained by adsorption on the catalyst and conveyed back into high temperature zone 212. Herein or within stripping zone 216 the nitrogen compounds are stripped from the catalyst and reconveyed in the vapor phase through high temperature reaction zone 212, again into low temperature reaction zone 208 for readsorption or reaction. Thus an internal recycling of the heavier more difficulty convertible constituents results which ultimately causes the thermal and catalytic decomposition of these compounds to hydrocarbon products of the desired boiling range and either hydrogen sulfide, water, or ammonia, depending upon whether the constituent is a hydrocarbon compound of sulfur, oxygen, or nitrogen respectively.

Again, in the low temperature reaction zone conditions are chosen so that the mass flow rate times the specific heat of the combined quench vapor and the effluent from high temperature reaction zone 212 exceeds the mass flow rate times the specific heat of the catalyst flow therethrough by an amount sufficient to establish the desired low temperature. Generally, mass specific heat ratios of between 0.1 and 0.95 are sufficient. Thus the oil vapor flow thermally dominates the catalyst flow and consequently the temperature established within the low temperature reaction zone 208 is controlled by the temperature of the combined quench and effluent vapor from zone 212 and the temperature gradient from the low temperature within zone 208 to that at which the catalyst is introduced into column 210 exists in the upper part of low temperature zone 208 as indicated in Figure 4.

The reaction product is removed from product disengaging zone 206 via line 234 at a rate controlled by valve 236 and at least part thereof is conveyed directly into fractionation column 16. A part thereof, however, may be passed via line 238 at a rate controlled by valve 240 into cooler and condenser 242. The condensate is subsequently passed via lines 244 and 246 via quench fluid pump 248 and line 250 controlled by valve 252 into quench fluid engaging zone 210. The quench fluid flow rate may be controlled in accordance with temperature recorder controller 254 acting in accordance with thermocouple 256 or other equivalent temperature-sensitive means, or these means may be employed to vary the solids flow rate by operating valve 219. Such solids flow control may also be used in the modification shown in Figure 1 employing solids valves 30 and 32.

If desired, and entirely analogous to the fractionation system shown in Figure 1, other fractions of the product may be separated in fractionator 16 and passed as previously described as the quench fluid into the contacting column.

Under the conditions described above for gasoline treating, an 88.4% liquid yield is obtained in which the light gasoline product had 0.001% nitrogen and 0.1% sulfur and the heavy gasoline (approximate boiling range 300° F. to 400° F.) had 0.002% nitrogen and 0.05% sulfur. The octane rating of the combined product gasoline is 90.5 (Research + 3 ml. TEL) compared with 71.0 (Research + 3 ml. TEL) for the feed stock.

Referring now to Figure 4, a typical temperature profile of the fluids and the catalyst in reaction column 200 is indicated. The catalyst is introduced at a temperature of 900° F. as indicated by portion 260 of the curve. As described, the oil vapor flow thermally dominates the downward catalyst flow thereby establishing a temperature break 262 immediately below product outlet 206. The substantial proportion of low temperature contacting zone 208 exists at a temperature of about 400° F. indicated by section 264 of the temperature curve. High temperature reaction zone 212 is maintained at a temperature of 800° F. as indicated by section 268 of the temperature curve. This temperature is maintained by the introduction of gasoline vapor at substantially the same temperature and in an amount which thermally dominates the counter flow of granular catalyst which leaves low temperature reaction zone 208 at a substantially lower temperature. Thus temperature break 266 is established at a point just below quench fluid inlet 210 because of the thermal dominance of the gasoline vapor feed.

Although the first modification having two contacting vessels was described in conjunction with an example of denitrogenation and cracking of gas oil, while the second example having a single contacting column was described as a gasoline treating process, either the two vessel or the one vessel modification may be employed in either reaction. Furthermore, the principle of establishing a dual temperature level in a bed of catalyst which is common to both modifications described above may be applied to other solids-vapor contacting processes than those involved in hydrocarbon conversions.

Beneficial results are obtained in the process of the present invention by hydrating the regenerated catalyst before it is introduced into the contacting or reaction zone. The hydration may be effected by injecting steam into the regeneration zone or by passing the regenerated catalyst through an atmosphere of steam at any point between removal from the regeneration zone and actual introduction of the catalyst into the reaction zone and substantially at the catalyst temperature and the operation pressure.

As an example of these results, the following data are given in which the low temperature zone of the process of this invention is operated at 625° F. to denitrogenate a cracked gasoline of 400° F. end point, the heavy gasoline fraction of which contains 0.093% nitrogen by weight. The catalyst employed is synthetic silica-alumina bead cracking catalyst and a catalyst-to-oil ratio of 1.34 is employed. The heavy gasoline fraction of the product contains 0.009% nitrogen when unhydrated catalyst is used and 0.004% nitrogen with hydrated catalyst. Similarly the light gasoline fraction, originally containing 0.025% nitrogen by weight, contains 0.002% nitrogen with unhydrated catalyst and 0.001% nitrogen with the hydrated catalyst. In each case about a 50% improvement in the product nitrogen content is attributable to the hydration of the catalyst. Also the desulfurization of the heavy gasoline fraction in the high temperature zone is materially improved, the sulfur contents being 0.39% for the feed, 0.240% and 0.176% for the product heavy gasoline when unhydrated and hydrated catalysts respectively are used.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. In a process for the catalytic conversion of hydrocarbons which comprises contacting said hydrocarbons successively with a conversion catalyst at a relatively high temperature and subsequently with a conversion catalyst at a relatively low temperature, the improvement which comprises recirculating said conversion catalyst through a regeneration zone and a conversion zone containing a relatively low and a relatively high temperature contacting zone, maintaining the catalyst flow in said contacting zones as moving beds of substantially compact catalyst, heating said hydrocarbons to be converted substantially to the desired relatively high temperature, passing the thus heated hydrocarbons in direct contact with the catalyst in said relatively high temperature contacting zone, flowing the effluent therefrom countercurrently through said relatively low temperature contacting zone, removing converted hydrocarbon product from said low temperature contacting zone, cooling at least part thereof, recycling at least part of the cooled product to said low temperature contacting zone as a quench fluid to combine with the effluent from said high temperature zone, controlling the quantity of quench fluid thus introduced in accordance with the temperature in said low temperature zone and maintaining the mass flow rate times the specific heat of the combined quench fluid and the high temperature effluent at a value exceeding the mass flow rate times the specific heat of the catalyst flowing through the low temperature zone.

2. A process according to claim 1 wherein the mass specific heat ratio established within said low temperature contacting zone is between 0.1 and 0.95.

3. A process according to claim 1 in combination with the step of passing regenerated catalyst through an atmosphere containing steam prior to contact with said hydrocarbons.

4. A process according to claim 1 in combination with the step of passing the flow of regenerated catalyst from said regeneration zone successively through said low temperature zone and said high temperature zone, passing said hydrocarbons countercurrently through said high temperature zone and subsequently in combination with said quench fluid countercurrently through said low temperature zone.

5. A process according to claim 1 in combination with the steps of dividing the flow of regenerated catalyst from said regeneration zone into two streams, passing one stream downwardly as a moving bed by gravity through said high temperature contacting zone, passing the other stream downwardly by gravity through said low temperature contacting zone, combining spent catalyst withdrawn from said low and high temperature contacting zones and passing the combined streams through said regeneration zone.

6. A process according to claim 5 in combination with the step of establishing a secondary high temperature contacting zone, passing spent catalyst from said low temperature zone therethrough prior to combination with spent catalyst from said high temperature contacting zone, and passing the effluent from said high temperature zone first countercurrently through said secondary high temperature zone prior to passage in combination with said quench fluid through said low temperature contacting zone.

7. A process for the catalytic conversion of hydrocarbons which comprises recirculating a conversion catalyst through a regeneration zone and through a conversion zone provided with two contacting zones of substantially different temperature, vaporizing a hydrocarbon stream to be converted in a heating zone, passing the vapor stream successively through the relatively high temperature and the relatively low temperature contacting zones maintained in said conversion zone, removing product hydrocarbon vapor from said low temperature zone, fractionating said product into desired fractions, recirculating part of said product in the liquid phase to said relatively low temperature contacting zone, directly contacting the catalyst flowing therethrough with said liquid thereby vaporizing it and absorbing heat therefrom, passing the vapor thus formed and the effluent from said high temperature zone countercurrently through said low temperature zone, controlling the quantity of said liquid thus injected so that the mass flow rate times the specific heat of catalyst divided by the mass flow rate times the specific heat of vaporized quench liquid and high temperature zone effluent is less than 1.0, contacting spent catalyst in said regeneration zone with a gas containing oxygen forming a regenerated catalyst, and passing the thus regenerated catalyst through an atmosphere of steam prior to reintroduction into said conversion zone.

8. A process according to claim 7 wherein said low temperature zone is maintained at a temperature between 300° F. and 700° F. and said high temperature zone is maintained at a substantially higher temperature and between 700° F. and 1200° F.

9. A process according to claim 8 wherein said hydrocarbon comprises a petroleum gas oil containing hydrocarbon compounds of nitrogen, the conversion effected is a simultaneous catalytic cracking and denitrogenation, said product contains cracked hydrocarbons and ammonia and wherein said catalyst comprises a synthetic silica-alumina bead cracking catalyst.

10. A method according to claim 8 wherein the mass flow rate times specific heat ratio is between 0.1 and 0.95.

11. A process for the conversion of hydrocarbons which comprises maintaining a recirculating stream of silica-alumina cracking catalyst flowing through a regeneration zone and as a downwardly moving substantially compact bed through a conversion zone containing a relatively low temperature zone and a relatively high temperature zone, contacting the regenerated catalyst with steam to form an active hydrated catalyst, dividing the hydrated catalyst flow into two streams, passing one stream through said high temperature zone, passing the other stream through said low temperature zone, combining spent catalyst from said zones for introduction into said regeneration zone, heating and vaporizing a hydrocarbon mixture containing hydrocarbon compounds of nitrogen, passing the vapor thus formed through said high temperature zone, subsequently passing the effluent therefrom countercurently through said low temperature zone, removing product vapors therefrom, cooling and condensing at least part of said product vapors, recirculating at least part of the condensate as a quench liquid to a point within said low temperature zone, maintaining the desired temperature therein by varying the quantity of recirculated condensate, and maintaining the mass specific heat of combined effluent from said high temperature zone and vaporized recirculated condensate in excess of the mass specific heat of the catalyst stream within said low temperature zone.

12. A process according to claim 11 wherein said hydrocarbon mixture comprises a mixture boiling in the gasoline range and contaminated with hydrocarbon compounds of sulfur, oxygen, and nitrogen, the temperature of said relatively low temperature zone is between 300 and 700° F. the temperature of said relatively high temperature zone is substantially above that of said low temperature zone and between 700° and 1200° F. and wherein said product contains hydrocarbons and water, hydrogen sulfide and ammonia.

13. A process according to claim 11 wherein said hydrocarbon mixture comprises a gas oil fraction containing hydrocarbon compounds of nitrogen and sulfur, said low temperature zone is maintained at a temperature of between about 400° F. and 675° F. to effect adsorption of said hydrocarbon compounds of nitrogen on said catalyst and said high temperature zone is maintained at a temperature between 800° F. and 1050° F. to effect cracking of the gas oil.

14. A process according to claim 11 in combination with distilling the product from the low temperature zone and recirculating a fraction from the distilling operation as said quench liquid.

15. A process for the conversion of hydrocarbons which comprises maintaining a recirculating stream of silica-alumina cracking catalyst flowing through a regeneration zone and as a downwardly moving substantially compact bed by gravity through a conversion zone containing a low temperature and a high temperature zone in succession, contacting the regenerated catalyst with steam to form an active hydrated catalyst prior to flowing the catalyst through said low and high temperature zones, heating and vaporizing a hydrocarbon mixture containing hydrocarbon compounds of nitrogen, passing the vapor thus formed successively through said high and low temperature zones countercurrent to the catalyst flow therethrough, removing hydrocarbon products from said low temperature zone, cooling and condensing at least part of said products, recirculating at least part of the condensate as a quench liquid to a point between said high and low temperature zone whereby said liquid is revaporized and flows again together with the vaporized feed through said low temperature zone, controlling the flow rate of said quench liquid to maintain the temperature in said low temperature zone and maintaining the mass specific heat of total fluid flowing through said low temperature zone to a value in excess of the mass specific heat of the catalyst flow therethrough.

16. A process according to claim 15 wherein said hydrocarbon mixture comprises a mixture boiling in the gasoline range and contaminated with hydrocarbon compounds of sulfur, oxygen, and nitrogen, the temperature of said relatively low temperature zone is between 300 and 700° F. the temperature of said relatively high temperature zone is substantially above that of said low temperature zone and between 700 and 1200° F. and wherein said product contains hydrocarbons and water, hydrogen sulfide and ammonia.

17. A process according to claim 15 wherein said hydrocarbon mixture comprises a gas oil fraction containing hydrocarbon compounds of nitrogen and sulfur, said low temperature zone is maintaining at a temperature of between about 400° F. and 675° F. to effect adsorption of said hydrocarbon compounds of nitrogen on said catalyst and said high temperature zone is maintained at a temperature between 800° F. and 1050° F. to effect cracking of the gas oil.

18. A process according to claim 15 in combination with distilling the product from the low temperature zone and recirculating a fraction from the distilling operation as said quench liquid.

19. A process for continuously contacting a stream of fluids with granular solid contact material in two stages of substantially different temperature which comprises passing a moving bed of granular solids downwardly by gravity through a contacting zone containing a low temperature zone and a high temperature zone in succession, heating the fluids to be treated to at least the temperature desired in the high temperature zone, countercurrently passing said fluid through said high temperature zone and said low temperature zone in succession, removing product effluent from said low temperature zone, cooling and condensing at least part of said effluent, recirculating at least part of the effluent condensate into said contacting zone between said low and high temperature zones whereby vaporization of said condensate occurs and the vapor passes again through said low temperature zone for retreatment together with further quantities effluent from said high temperature zone and maintaining a desired low temperature in said low temperature zone by controlling the recirculation rate of said condensate and by maintaining the mass specific heat of the total fluid flow through said low temperature zone greater than the mass specific heat of the countercurrent flow of solids.

20. A process according to claim 19 wherein said stream of fluids entering said low temperature zone from said high temperature zone contains more readily adsorbable constituents in combination with the steps of maintaining said low temperature at a value sufficiently low to selectively adsorb said constituents on said solid contact material while maintaining conditions in said high temperature zone adapted to desorb said constituents therefrom whereby an internal recycle of said constituents for retreatment is established and maintained.

21. A process according to claim 20 wherein the conditions of said low and said high temperature zones are maintained at values adapted to effect the ultimate conversion of the constituents of said internal recycle into less readily adsorbable constituents which are removed with said low temperature zone effluent.

22. A process according to claim 21 wherein said fluids to be contacted comprise hydrocarbons containing contaminating hydrocarbon compounds selected from the group consisting of oxygen, sulfur and nitrogen which are more readily adsorbable in said low temperature zone and which ultimately decompose in said internal recycle to form a volatile hydrocarbon fragment and a compound selected from the group consisting of water, hydrogen sulfide and ammonia.

References Cited in the file of this patent

UNITED STATES PATENTS

| | | |
|---|---|---|
| 2,384,315 | Kuhl | Sept. 4, 1945 |
| 2,384,942 | Marisic | Sept. 18, 1945 |
| 2,418,673 | Sinclair et al. | Apr. 8, 1947 |
| 2,419,517 | Eastwood | Apr. 22, 1947 |
| 2,420,904 | Noll | May 20, 1947 |
| 2,433,603 | Danner et al. | Dec. 30, 1947 |
| 2,437,222 | Crowley et al. | Mar. 2, 1948 |
| 2,448,257 | Evans | Aug. 31, 1948 |
| 2,469,332 | Evans | May 3, 1949 |
| 2,489,628 | Evans | Nov. 29, 1949 |
| 2,526,701 | Shirk | Oct. 24, 1950 |
| 2,614,968 | Simms | Dec. 12, 1952 |